Dec. 5, 1939.                J. N. MAGOVERN                2,181,977
                              PLANT MARKER
                            Filed June 6, 1938
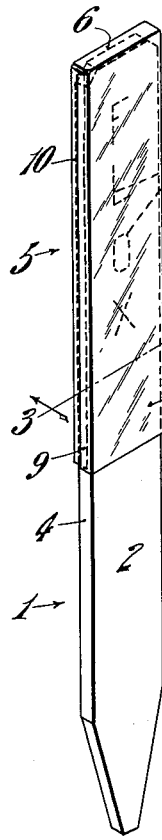
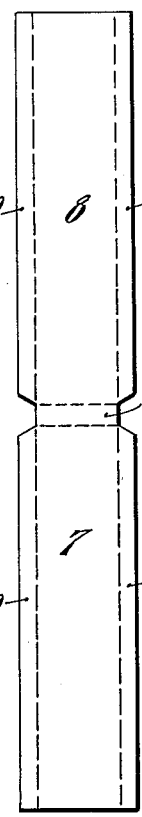
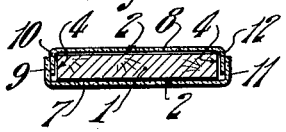
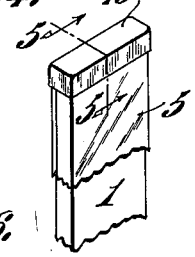
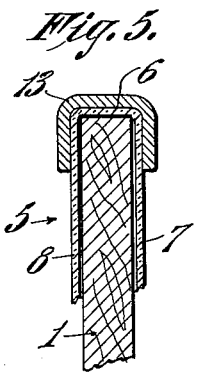
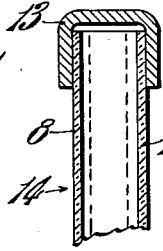
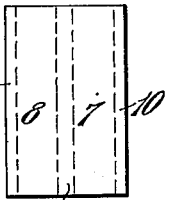
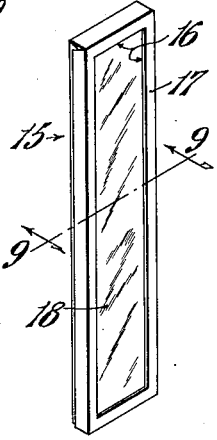
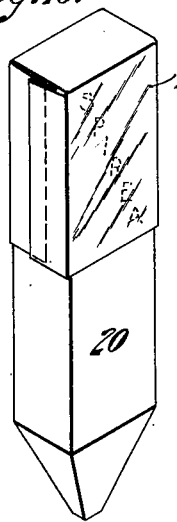
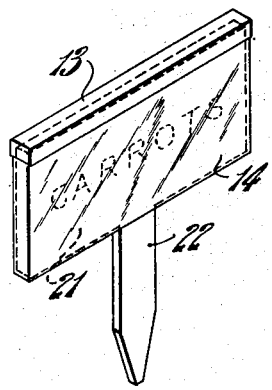
INVENTOR,
John N. Magovern,
BY
ATTORNEY.

Patented Dec. 5, 1939

2,181,977

UNITED STATES PATENT OFFICE 2,181,977

PLANT MARKER

John N. Magovern, Agawam, Mass.

Application June 6, 1938, Serial No. 212,138

2 Claims. (Cl. 40—2)

This invention relates to improvements in plant markers, and is particularly directed to means for preserving and protecting any inscription which may be printed, or written, on the plant marker.

An object of this invention is to provide a simple, economical, protective casing for plant markers, either wholly or partially transparent, for use in combination with the plant marker, so that any inscription on the plant marker will be readily visible at all times, and yet the inscription will be covered and protected from the effects of weather.

Plant markers are used either as tags or stakes, and are generally made of wood, and the inscription descriptive of the plant or shrub marked, is generally printed, or written, on the wood. As the marker is exposed to the weather, the inscription becomes blurred and unreadable. Thus, the article marked loses its identity, and the purpose of the marker is defeated.

It is an object of this invention to provide, for plant markers, a weatherproof casing for covering and protecting an inscription on the marker, with a portion, at least, of the casing transparent, so that the inscription on the plant marker will be plainly visible through the casing.

These, and other objects and advantages of this invention, will be more completely described and disclosed in the following specification, the accompanying drawing, and the appended claims.

Broadly, this invention comprises a casing member having four sides and a top, and formed to fit on a plant marker with sufficient clearance so that the casing will readily slide on and off the marker; at least one of the sides of the casing being transparent.

Preferred embodiments of this invention are illustrated in the accompanying drawing, in which:

Fig. 1 is a perspective view of a plant marker with a protective casing installed thereon, Fig. 2 is a developed view of a blank from which the casing in Fig. 1 is made, Fig. 3 is a cross sectional view on the line 3—3 of Fig. 1, Fig. 4 is a partial view similar to Fig. 1, showing a cap for the casing, Fig. 5 is a sectional view, taken on the line 5—5 of Fig. 4, Fig. 6 is a sectional view similar to Fig. 5, illustrating a modified form of casing and cap, Fig. 7 is a developed view of a blank from which the casing shown in Fig. 6 is made, Fig. 8 is a perspective view of a modified form of casing, of opaque material with a transparent window, Fig. 9 is a cross sectional view taken on the line 9—9 of Fig. 8, and Figs. 10 and 11 are perspective views illustrating diagrammatically adaptations in dimensions and proportions of the invention to other styles and types of plant markers.

Referring now to the drawing in detail, in which like numerals refer to like parts throughout, A plant marker, or tag 1, is commonly formed as a flat, parallel sided strip having relatively broad faces 2 for receiving an inscription 3 and relatively narrow edges 4. A casing 5, of transparent material, such as "celluloid" is formed to slide readily over the marker 1 to cover the inscription 3 and protect the inscription from the effects of weather.

The casing 1 is preferably formed from a blank 5', with a top portion 6, front and back walls 7 and 8, and sides 9, 10, 11, and 12. The blank 5' is folded, as indicated by dash lines in Fig. 2, and the edges 9 and 10, and 11 and 12, sealed or joined in any suitable manner, such as with a combination of heat and pressure which is customary in forming and shaping articles of "celluloid".

In some climates, or under certain conditions of location and exposure, it is desirable to protect the top 6 of the casing 5 from the direct action of the sun's rays. This is particularly true when the material of which the casing 5 is made is Celluloid. For this purpose, an auxiliary cap 13 is provided, which is preferably made to fit snugly over the end of the casing 5, as a press fit, whereby the cap 13 and casing 5 are an integral unit after once being assembled. The cap 13 may be made of any suitable material, but is preferably made of one of the common plastics, such as rubber or "bakelite", and may be made in attractive colors. This provision of a colored cap for the casing has an added advantage in that a particular marker may be distinguished from the rest and recognized at a considerable distance by the color of the cap.

A modified form of casing is illustrated in Figs. 6 and 7, in which the top 6 is omitted, the casing 14 being open at both top and bottom, and the cap 13 pressed onto the casing 14 to cover the open top. In this form of casing, the blank is made, as indicated in Fig. 7, and folded, as indicated by the dash lines in Fig. 7.

Figs. 8 and 9 illustrate a further modification of the invention, in which a casing 15 is made of opaque material and formed with an opening 16 in its front face 17. The opening 17 is closed to form a window by a transparent strip 18, secured on the inside of the casing 15, as best indicated in Fig. 9.

Figs. 10 and 11 illustrate the adaptability of the invention to plant stakes, or markers, of varied shape and size. In Fig. 10, a transparent casing 19 is shown fitted on a stake 20 which is relatively thicker than the marker 1, and in Fig. 11, a casing 14 and cap 13 are shown covering the sign portion 21 of a large, rectangular, staked marker 22.

What I claim is:

1. In combination, in a plant marker, a stake member, a transparent casing removably supported on said stake member, the sides of said casing being overlapped and sealed, and an opaque cap secured on said transparent casing.

2. In combination, in a plant marker, a stake member, an open ended transparent sleeve, an opaque cap secured on said sleeve and covering one open end thereof, said sleeve being removably supported on said stake by engagement of said cap on the top of said stake.

JOHN N. MAGOVERN.